Jan. 30, 1923. 1,443,685
R. HUFF.
STEERING GEAR.
FILED DEC. 30, 1919.
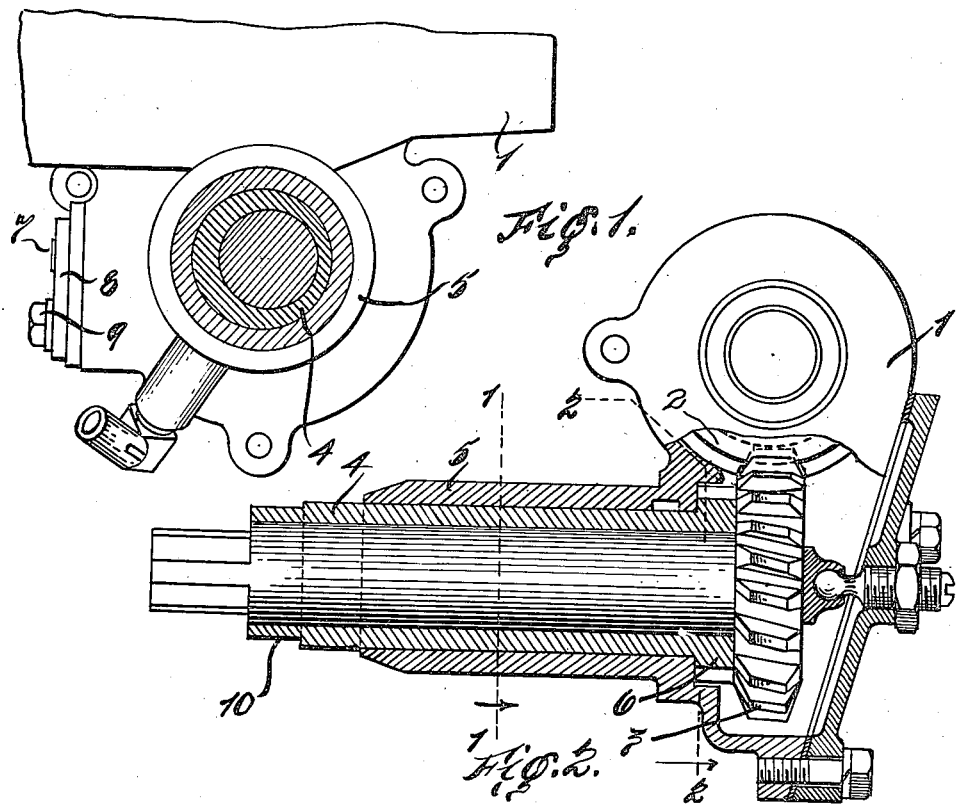
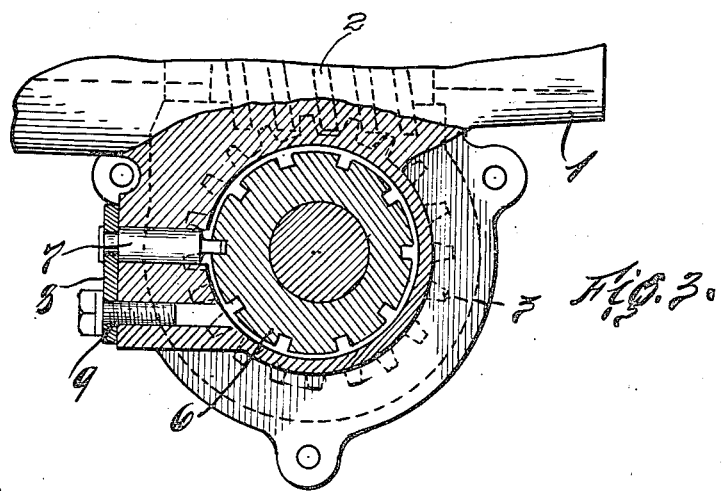
Inventor
Russell Huff
By his Attorney
Emerson R. Newell Patented Jan. 30, 1923.

1,443,685

UNITED STATES PATENT OFFICE.

RUSSELL HUFF, OF DETROIT, MICHIGAN, ASSIGNOR TO DODGE BROTHERS, OF DETROIT, MICHIGAN, A CORPORATION OF MICHIGAN.

STEERING GEAR.

Application filed December 30, 1919. Serial No. 348,480.

*To all whom it may concern:*

Be it known that I, RUSSELL HUFF, a citizen of the United States, residing at Detroit, Michigan, have invented certain new and useful Improvements in Steering Gears, of which the following is a clear, full, and exact description.

This invention relates to steering mechanism for motor vehicles and the like, and the object thereof is to improve the construction of the steering gear, particularly as to adjustment thereof, whereby such adjustment is more easily made, and the parts when adjusted are securely locked and held in their adjusted positions.

In the accompanying drawing, which shows a practical embodiment of the invention, Fig. 1 is a sectional view on the line 1—1 of Fig. 2;

Fig. 2 is a part sectional, part elevational view showing the invention; and

Fig. 3 is a section on the line 2—2 of Fig. 2.

Referring to the drawings in detail, 1 indicates a support for a steering mechanism, said support carrying a worm 2, which may be connected directly to the steering post. The worm 2 meshes with a worm wheel 3 supported in a bushing 4, carried by a bracket 5 integral with or secured to the support 1.

In order to provide for adjustment of the worm wheel relatively to the worm, the bushing supporting the worm wheel is bored eccentrically, so that by rotating it in the casing 5 the distance from the centre line of the worm wheel to the centre line of the worm may be adjusted either to get the proper initial clearance, or to compensate for wear.

In order to securely hold the worm wheel in its various positions of adjustment, I provide means supported on the casing for this purpose. Preferably said holding or locking means consists of a notched flange 6 secured to, or formed integral with the bushing, and provided with a pin 7 of circular section and having a flattened end which engages with the notches in the flange 6. Said pin is carried by a plate 8 held against the outside of the casing by a cap screw 9 threaded into the casing.

To adjust the worm wheel, the cap screw and locking pin are removed, and the bushing is rotated. To facilitate such rotation, the bushing may be provided with flats 10 to be engaged by a wrench. With the construction described, ease of adjustment is secured and the parts are also securely locked, due to the fact that the bushing is locked directly to the casing, so that in case of any rotation of the casing the bushing is carried with it.

In some constructions heretofore employed, in which the bushing is locked to the frame of the vehicle, the proper relation of the bushing to the casing is not necessarily maintained if for any reason the steering gear as a whole should be rotated in its support.

While the drawings and description disclose a practical embodiment of my invention, it is to be understood that variations may be resorted to without departing from the spirit thereof.

Having thus described my invention, what I claim and desire to secure by Letters Patent is:

1. In a steering mechanism, the combination with a worm and a worm wheel, of an eccentrically bored bushing supporting said worm wheel at one end, a casing for said bushing, said bushing having means at its end opposite from said wheel for rotating it to thereby adjust said worm wheel with respect to said worm, said bushing also having notches adjacent said worm wheel and means carried by said casing for engaging said notches to hold said bushing in adjusted position.

2. In a steering mechanism, the combination with a worm and a worm wheel, of an eccentrically bored bushing supporting said worm wheel at one end, a casing for said bushing, said bushing having means at its end opposite from said wheel for rotating it to thereby adjust said worm wheel with respect to said worm, said bushing also having a notched portion situated within said casing and means carried by said casing for engaging said notched portion to hold said bushing in adjusted position.

3. In a steering mechanism, the combination with a worm and a worm wheel, of an eccentrically bored bushing supporting said worm wheel at one end, a casing for said bushing, said bushing having means at its end opposite from said wheel for rotating it to thereby adjust said worm wheel with respect to said worm, said bushing also having a notched portion within said casing and adjacent to said worm wheel and means carried by said casing for engaging said notched portion to hold said bushing in adjusted position.

4. In a steering mechanism, the combination with a worm and a worm wheel, of an integral eccentrically bored bushing supporting said worm wheel, a casing for said bushing, said bushing having means for rotating it to adjust said worm wheel with respect to said worm, said bushing having a notched portion adjacent said worm wheel and a pin carried by said casing and having a flattened end for fitting into said notched portion.

Signed at Detroit, Michigan, this 3rd day of December, 1919.

RUSSELL HUFF.

Witnesses:
J. R. FURSE,
ALFRED H. KNIGHT.